United States Patent [19]
Van Der Lely

[11] 4,324,123
[45] Apr. 13, 1982

[54] SOIL CULTIVATING IMPLEMENTS

[76] Inventor: Cornelius Van Der Lely, 7, Brüschenrain, Zug, Switzerland

[21] Appl. No.: 88,160

[22] Filed: Oct. 25, 1979

[30] Foreign Application Priority Data

Oct. 27, 1978 [CH] Switzerland ............... 7810716

[51] Int. Cl.³ ............................................. A01B 33/06
[52] U.S. Cl. ................................. 172/49.5; 172/713; 172/769; 172/749
[58] Field of Search ............... 172/59, 111, 719, 713, 172/49, 49.5, 769

[56] References Cited

U.S. PATENT DOCUMENTS

| | | | |
|---|---|---|---|
| 2,088,141 | 7/1937 | Royston | 172/111 |
| 2,110,790 | 3/1938 | Daugherty | 172/59 |
| 2,606,413 | 8/1952 | Gray | 172/713 |
| 2,622,498 | 12/1952 | Wharton | 172/59 X |
| 3,774,687 | 11/1973 | Lely | 172/59 |
| 3,783,948 | 1/1974 | Lely | 172/59 X |
| 3,897,831 | 8/1975 | Lely | 172/59 |
| 3,902,560 | 9/1975 | Lely | 172/713 |
| 3,920,079 | 11/1975 | Lely | 172/111 |
| 4,014,272 | 3/1977 | Lely | 172/59 |
| 4,046,201 | 9/1977 | Lely | 172/59 |

FOREIGN PATENT DOCUMENTS

| | | | |
|---|---|---|---|
| 863721 | 1/1953 | Fed. Rep. of Germany | 172/713 |
| 2401637 | 7/1974 | Fed. Rep. of Germany | 172/59 |
| 1243716 | 9/1960 | France | 172/111 |
| 697348 | 9/1953 | United Kingdom | 172/719 |

Primary Examiner—Richard J. Johnson

[57] ABSTRACT

A cultivating implement has an elongated frame portion that mounts a row of rotors, each rotor having an upwardly extending shaft and a lower tine. The lower shaft end is a flattened horizontal part with a threaded stub shaft that extends through a central hole in a matching horizontal tine fastening portion. A nut secures the fastening portion to the shaft end part and the nut is surrounded by a space partly defined by side cheeks of the fastening portion. Preferably, the inner side of the tine is concave and the recess formed therein merges into the space. A lug of the fastening portion fits into a recess of the shaft part to further secure the tine to the shaft. The soil working portion tapers downwardly from a curved intermediate portion to a lower tip that can be replaced.

8 Claims, 13 Drawing Figures

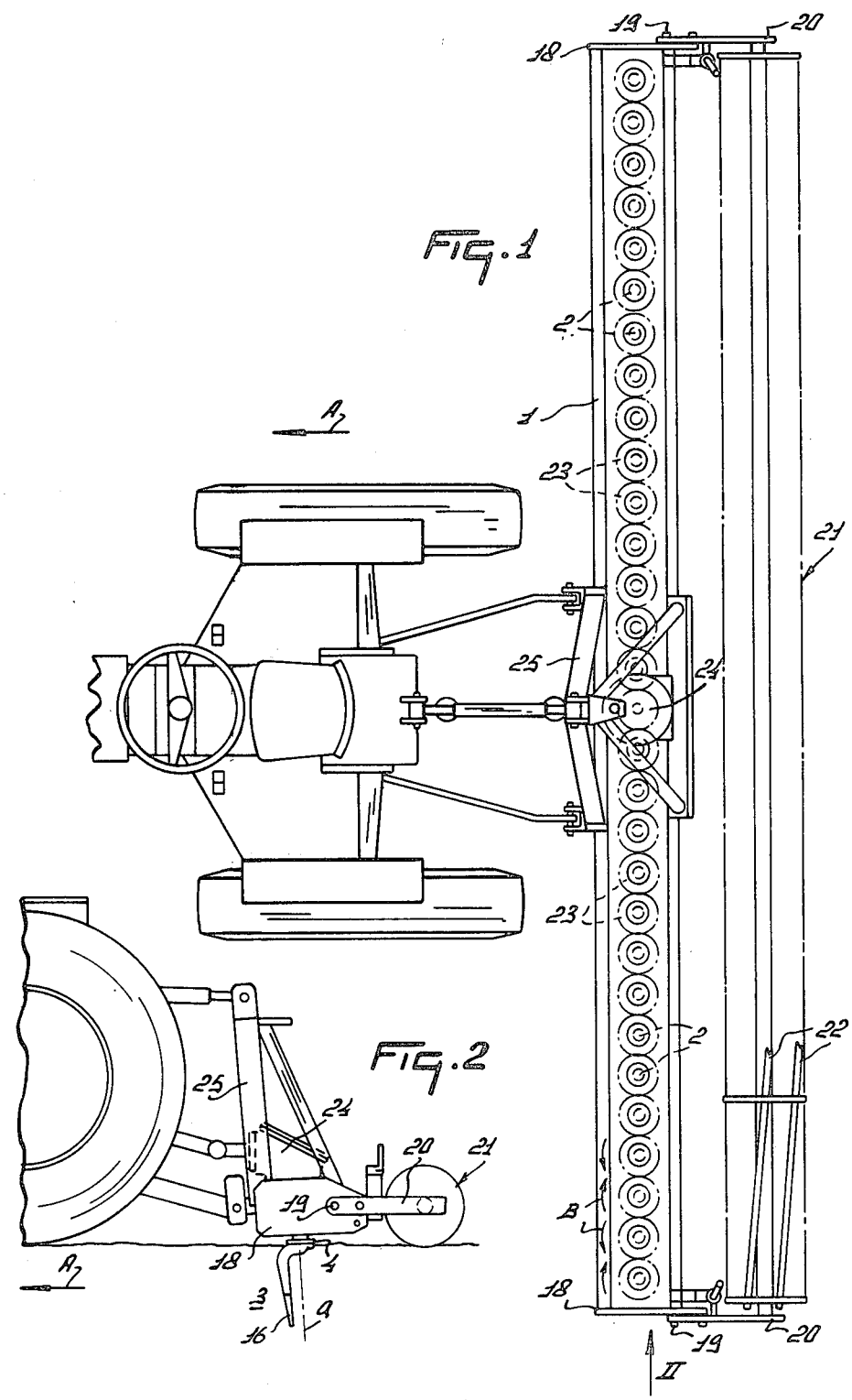

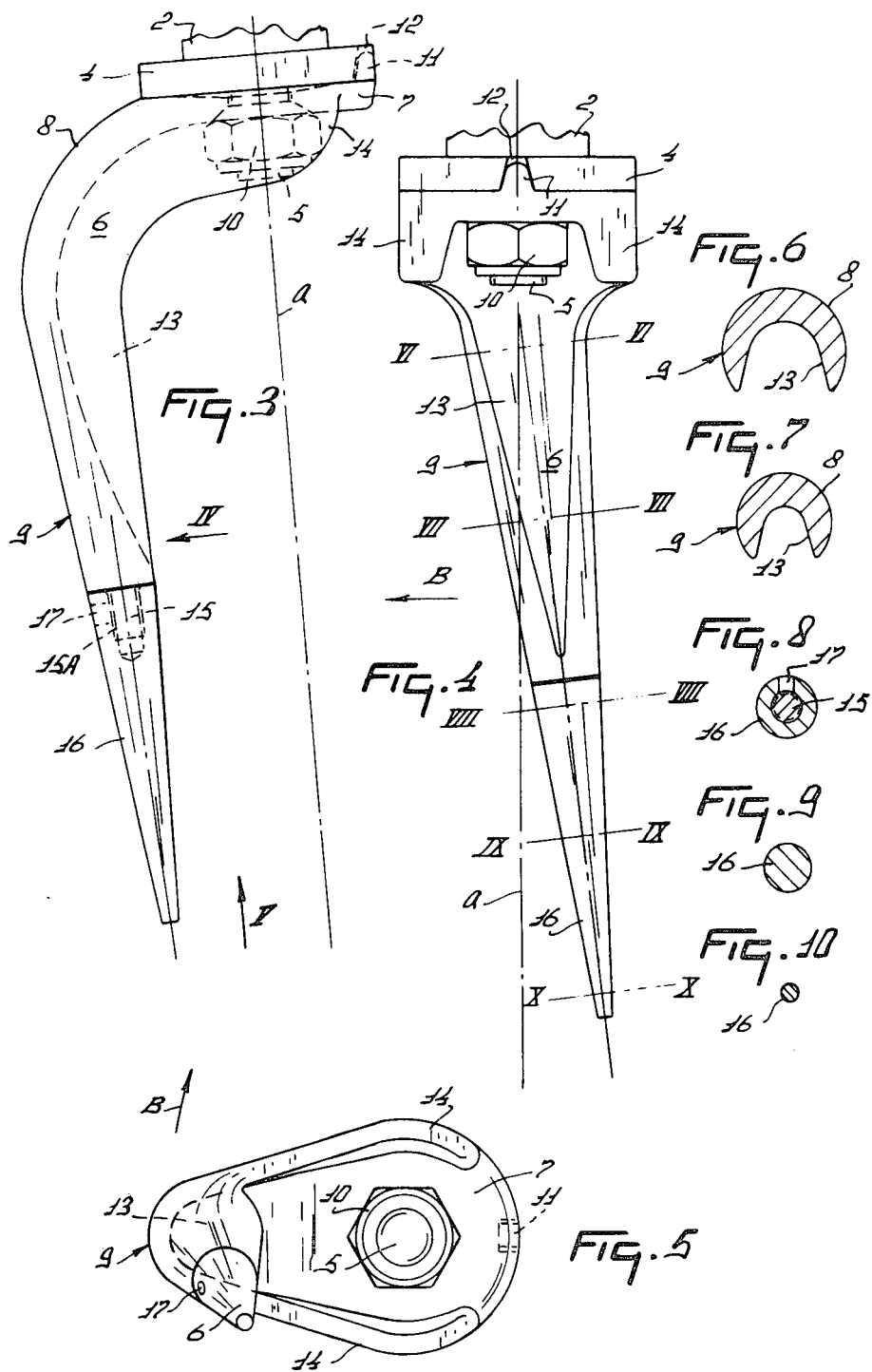

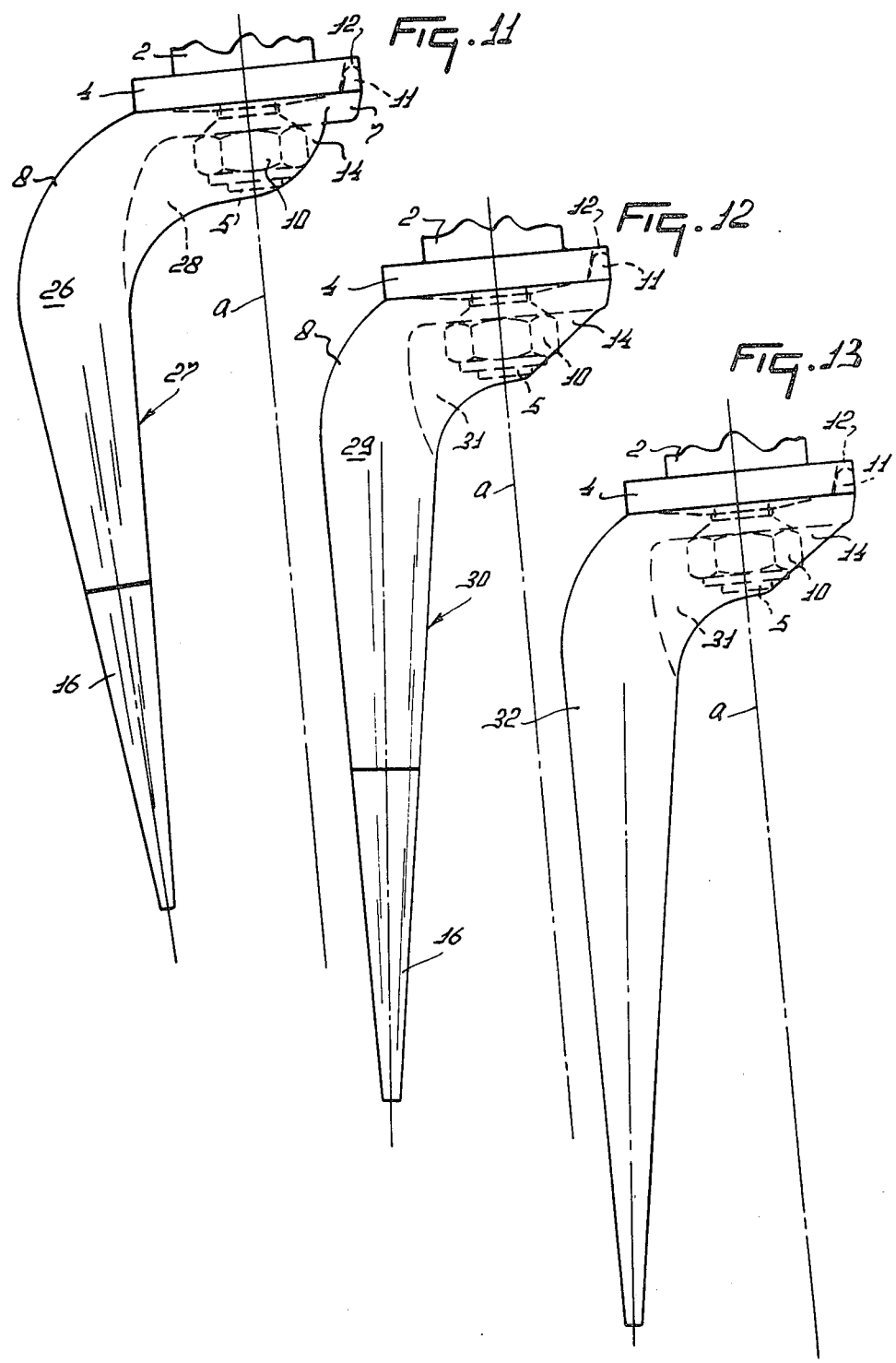

SOIL CULTIVATING IMPLEMENTS

This invention relates to soil cultivating implements or machines of the kind which comprise a frame portion that is movable over the ground and at least one soil working member arranged to be rotatable, by a power source, about a non-horizontal axis, the or each such member having, or being afforded by, only a single soil working tine. The term "implement(s) or machine(s)" will be shortened to "implement(s)" alone throughout the remainder of this specification for the sake of brevity.

Known soil cultivating implements of this kind involve the disadvantage that the or each single tine can only be firmly and reliably fastened in its appointed working position in a relatively complicated and consequentially relatively expensive manner. Accordingly, one aspect of the present invention seeks to overcome, or very significantly to reduce, this drawback by providing a soil cultivating implement of the kind set forth, wherein the or each single tine comprises a fastening portion which is secured in its appointed working position relative to a shaft embodying the axis of rotation of the soil working member or corresponding soil working member by clamping means whose center is substantially co-incident with said axis of rotation.

For a better understanding of the invention, and to show how the same may be carried into effect, reference will now be made, by way of example, to the accompanying drawings, in which:

FIG. 1 is a somewhat diagrammatic plan view of a soil cultivating implement in accordance with the invention shown connected to the rear of an agricultural tractor, FIG. 2 is a side elevation as seen in the direction indicated by an arrow II in FIG. 1, FIG. 3 is a side elevation, to an enlarged scale, showing the single tine of one soil working member of the implement of FIGS. 1 and 2 and the way in which it is secured in its appointed working position, FIG. 4 is an elevation as seen in the direction indicated by an arrow IV in FIG. 3, FIG. 5 is an underneath plan view corresponding to FIGS. 3 and 4 and as seen in the direction indicated by an arrow V in FIG. 3, FIGS. 6, 7, 8, 9 and 10 are sections taken on the lines VI—VI to X—X, respectively, in FIG. 4, and FIGS. 11, 12 and 13 are side elevations from the same viewpoint, and to the same scale, as FIG. 3 but illustrate the constructions of second, third and fourth embodiments of soil working tines in an implement in accordance with the invention and the ways in which said three tines are secured in their appointed working positions.

Referring to FIGS. 1 to 10 of the accompanying drawings, and firstly to FIGS. 1 and 2 thereof, the soil cultivating implement that is illustrated comprises a hollow box-section frame portion 1 which extends substantially horizontally transverse and usually, as illustrated, substantially horizontally perpendicular, to the intended direction of operative travel of the implement which is denoted in FIGS. 1 and 2 of the drawings by an arrow A. A plurality, of which there are thirty in the example that is being described, of shafts 2 are journalled in the hollow frame portion 1 so as to be rotatable about corresponding non-horizontal axes a (FIGS. 3 and 4) which axes a will usually, but not essentially, be substantially vertically disposed when the implement is working on horizontal land. An inspection of FIG. 3 of the drawings will show that, in fact, under these circumstances each axis a is contained in a vertical plane that is substantially parallel to the direction A and is inclined upwardly and forwardly at an inclination of only a few degrees to the strict vertical. The longitudinal axes a of the shafts 2, which are also their axes of rotation, are spaced apart from one another at regular intervals which preferably, but not essentially, have magnitudes of substantially 15 centimeters. Each shaft 2 projects downwardly from beneath the bottom of the hollow frame portion 1, the lower end of the downwardly projecting portion being integrally formed with a supporting part 4 embodied in a flat circular disc whose general plane is perpendicular to that of the corresponding axis a. The lower surface of each supporting part 4 integrally carries, at its center, a screwthreaded stub shaft 5 whose longitudinal axis is coincident with the corresponding axis a.

Each supporting part 4 has a corresponding soil working member 3 clamped to its lower surface and, in the embodiment which is being described, each soil working member 3 is afforded by a single soil working tine 6. Each tine 6 comprises a fastening portion 7 which is releasably secured in its appointed working position relative to the respective supporting part 4, at the lower end of one of the shafts 2, by clamping means which will be further described below. It will be seen from FIGS. 3 and 4 of the drawings that the fastening portion 7 of each tine 6 is integrally connected by a curved portion 8 to a straight downwardly directed soil working portion 9 which portion 9 is of downwardly tapering configuration. The sizes and shapes of the portions 7, 8 and 9 are such that, with the preferred spacing between the axes a that has been discussed above, the longitudinal axis of each straight downwardly tapering soil working portion 9 is spaced by not less than 5 centimeters, and preferably substantially 6 centimeters, from the longitudinal axis a of the respective shaft 2 at the location at which said longitudinal axis and the axis a are closest to one another. At least as seen in FIG. 3 of the drawings, the longitudinal axis of the soil working portion 9 of the illustrated tine 6 is further from the corresponding axis a at the upper end of that portion 9 than it is at the lower end thereof.

The fastening portion 7 of each tine 6 is centrally recessed to a small extent around a central hole which receives the corresponding stub shaft 5, said fastening portion 7 otherwise being of much the same diameter and thickness as is the overlying supporting part 4. A nut 10 co-operates with each screwthreaded stub shaft 5 and wholly or principally affords the clamping means by which the fastening portion 7 of each tine 6 is secured in its appointed working position relative to the corresponding shaft 2. Each nut 10 clamps the upper surface of the corresponding tine fastening portion 7 firmly against the lower surface of the co-operating supporting part 4 and it will be seen from FIG. 3 of the drawings that the upper clamping surface of each nut 10 is of upwardly tapering conical configuration which bears centrally against a matchingly shaped surface formed in the mouth of the hole through the fastening portion 7 which receives the stub shaft 5. The upper surface of each fastening portion 7 is formed, at a peripheral location which is opposite to the area at which said fastening portion 7 is integrally connected to the corresponding curved portion 8, with an upwardly directed lug 11 whose opposite flat sides (FIG. 4) are inclined to one another at an angle of substantially 30°. As can be seen in FIGS. 3 and 4 of the drawings, each lug 11 fits in a matchingly shaped notch or recess 12 that is formed at the edge of the respective supporting part 4 and it will be appreciated that, when the nut 10 has been tightened on the stub shaft 5, the co-operation between the lug 11 and notch or recess 12 positively prevents the tine 6 from being turned about the respective axis a relative to the overlying shaft 2 and its supporting part 4.

The soil working portion 9 of each tine 6 is formed with a cavity 13 which cavity 13 commences at a location approximately midway along the length of the radially inner side of said portion 9, the cavity 13 extending upwardly from this point in a progressively widening, and initially progressively deepening, manner, the cavity 13 extending into the curved portion 8 of the tine 6 so as eventually to have its opposite sides merge with two cheeks 14 which cheeks 14 are downward extensions of the fastening portion 7 which lie at opposite sides of the clamping nut 10 when the latter is in position. Reference is directed particularly to FIGS. 3 to 7 inclusive of the drawings to show the formation and disposition of the cavity 13 and of the cheeks 14. FIG. 5 of the drawings shows that the ends of each pair of cheeks 14 which are remote from the soil working portion 9 of the corresponding tine 6 are spaced apart from one another angularly about the respective axis a by substantially 75°. As can be seen in FIG. 3 of the drawings, the depth of the cavity 13 initially progressively increases upwardly to a point beyond which said depth remains substantially constant. The length of the cavity throughout which it is progressively increasing in depth is substantially equal to one-quarter of the overall length of the soil working portion 9 concerned which overall length includes a lower downwardly tapering replaceable element 16 which will be referred to again below.

The cross-sectional views of FIGS. 6 and 7 of the drawings show that the interior of the cavity 13 is of arcuately circular shape and, since the external surface of the soil working portion 9 is substantially circular, or arcuately circular, throughout its length, the cross-section of the soil working portion 9 at the level of FIG. 6 of the drawings is substantially sickle-shaped. Much the same shape is also to be found at the level of FIG. 7 of the drawings. The soil working portion 9 of each tine 6 preferably has a diameter of substantially 5 centimeters at its upper end which diameter should be at least five times and preferably substantially eight times the diameter of said portion 9 at its blunt lowermost end. The axial length of the soil working portion 9 should be not less than five times the diameter thereof at its upper end and should therefore, with the dimension which has been referred to above, not be less than substantially 25 centimeters. As mentioned above, the downwardly tapering replaceable element 16 affords the lower end of each soil working portion 9, the upper region of said portion 9 being formed, at its lower end and at a location beneath the commencement of the corresponding cavity 13, with a central axially extending screwthreaded extension 15 which is of reduced diameter. The upper end of the co-operating element 16 is formed with a matching screwthreaded bore 15A which will co-operate with the extension 15 in mounting the element 16 firmly but releasably on the upper region of the soil working portion 9. Each element 16 has a length which is substantially half that of the soil working portion 9 of which it forms part and is of downwardly tapering conical configuration having a truncated blunt lowermost end. A radial bore 17 is formed in each element 16 at the level of the corresponding screwthreaded bore 15A and is intended to receive the end of a rod or other lever which may be used to assist in installing the elements 16 on, or releasing them from, the screwthreaded extensions 15. In the example which is being described, the soil working portion 9 of each tine 6 has an overall length of substantially 30 centimeters and it will be noted from FIGS. 4 and 5 of the drawings that the longitudinal axis thereof is downwardly and rearwardly inclined by a few degrees so as to trail rearwardly with respect to the intended direction of operative rotation of the soil working member 3 concerned which direction is indicated by arrows B in FIGS. 1, 4 and 5 of the drawings.

The opposite ends of the hollow box-section frame portion 1 of the implement are closed by substantially vertically disposed side plates 18 which are parallel to one another and parallel or substantially parallel to the direction A. The side plates 18 project rearwardly beyond the remainder of the hollow frame portion 1 with respect to the direction A and the leading ends of corresponding arms 20 are turnably connected to said side plates 18 by strong horizontally aligned pivots 19. The arms 20 are turnable upwardly and downwardly about the pivots 19 relative to the side plates 18 and it will be seen from FIGS. 1 and 2 of the drawings that rearmost regions of said side plates 18 are formed with holes which are equidistant from the axis defined by the aligned pivots 19 and that the arms 20 are formed with single holes that can be brought into register with any chosen holes in said side plates 18 merely by turning the arms 20 upwardly or downwardly about the pivots 19 as may be required. Locking bolts or the like which are only diagrammatically illustrated in FIGS. 1 and 2 of the drawings are provided for entry through the holes in the arms 20 and the selected holes in the rear portions of the side plates 18 to retain the arms 20 in chosen angular settings about the pivots 19. The arms 20 project rearwardly from the side plates 18 with respect to the direction A and their rearmost ends carry substantially horizontally aligned bearings between which an openwork roller 21 is mounted so as to be freely rotatable about a substantially horizontal axis that is perpendicular or substantially perpendicular to the direction A. The roller 21 extends throughout substantially the whole of the combined working width of the thirty (in this embodiment) soil working members 3 and comprises a central axially extending support to which a plurality of circular support plates are secured at regular intervals along the length of the roller which intervals are such that one of said support plates lies at, or very close to, the opposite axial ends of the roller 21. The support plates are formed around their peripheries with circular rows of holes and elongate tubular or rod-formation elements 22 are entered lengthwise through said holes in relatively spaced apart relationship with one another so as preferably, as illustrated, to be wound helically around the central support of the roller 21 to some extent.

Each shaft 2 is provided, inside the hollow frame portion 1, with a corresponding straight-toothed or spur-toothed pinion 23, the size and arrangement of the pinions 23 being such that their teeth are successively in mesh with one another so that, during operation, each shaft 2 and the corresponding soil working member 3 will revolve in an opposite direction to the or each immediately neighbouring shaft 2 and soil working member 3. One of the center pair of shafts 2 in the single row of thirty (in this embodiment) such shafts has an upward extension through the top of the hollow frame portion 1 into a gear box 24 inside which bevel pinions (not visible) place said shaft extension in driven connection with a rotary input shaft of the gear box 24, the input shaft having a splined or otherwise keyed end which projects forwardly from the front of the gear box 24 in a direction which is substantially parallel to the direction A. The forwardly projecting end of the rotary input shaft of the gear box 24 is intended to be placed in driven connection with the rear power take-off shaft of an agricultural tractor or other operating vehicle by way of an intermediate telescopic transmission shaft, which is known per se, having universal joints at its opposite ends. This arrangement is illustrated diagrammatically in FIGS. 1 and 2 of the drawings. The front of the hollow frame portion 1, with respect to the direction A, is provided substantially midway across the width of the implement with a coupling member or trestle 25 which is of substantially triangular configuration as seen in either front or rear elevation. Strengthening tie beams diverge downwardly and rearwardly from substantially the apex of the coupling member or trestle 25 to have their spaced lowermost and rearmost ends rigidly secured to a strengthening beam which is mounted at the back of the hollow frame portion 1.

In the use of the soil cultivating implement which has been described, its coupling member or trestle 25 is connected to the three-point lifting device or hitch at the rear of an agricultural tractor or other operating vehicle in a manner which is generally known per se and which is illustrated diagrammatically in FIGS. 1 and 2 of the drawings and the forwardly projecting splined or otherwise keyed end of the rotary input shaft of the gear box 24 is placed in driven connection with the rear power take-off shaft of the same tractor or other operating vehicle by way of the known intermediate telescopic transmission shaft which has universal joints at its opposite ends. The maximum depth to which the tines 6 of the soil working members 3 can penetrate into the ground is adjusted, if required, before work commences by turning the arms 20 upwardly or downwardly about the aligned pivots 19 relative to the side plates 18 of the frame portion 1 and maintaining the newly adjusted positions by appropriate installation of the locking bolts or the like. FIGS. 1 and 2 of the drawings diagrammatically illustrate means for moving the arms 20, together with the roller 21, upwardly or downwardly relative to the side plates 18 but, since this means is known per se and does not form the subject of the present invention, it is not illustrated in detail and will not be described. The roller 21 thus performs a depth control function for the operation of the implement but also serves as a rotatable supporting member and as a soil working member since it will engage and crush any lumps of soil exceptionally left upon the ground surface by the immediately foregoing tines 6. The thirty (in this embodiment) soil working members 3 are revolved in the successively opposite directions B by the rotary power which is derived, in the manner briefly described above, from the tractor or other vehicle which moves the implement over the ground and it is preferred that each such member 3 should rotate at a speed of not less than 400 revolutions per minute. The size and shape of each tine 6 is such that it will work an individual strip of soil having a width of between substantially 20 and substantially 24 centimeters and the distance between the successive axes of rotation a should be substantially 15 centimeters. With this arrangement, the strips of land that are worked by the individual members 3 will overlap one another to produce a single broad strip of cultivated soil having, in the case of the particular implement which is being described, a width of substantially 4.5 meters. The implement operates in a way which makes it economical having regard to the ratio of the work done to the fuel consumed.

It will be recalled from the above description and can be seen in FIGS. 4 and 5 of the drawings that the soil working portion 9 of each tine 6 trails rearwardly from top to bottom with respect to the intended direction of operative rotation B of the soil working member 3 concerned. Each tine 6 has a relatively steep downward taper between the integral transition between its upper end and the corresponding curved portion 8 and its blunt small diameter lowermost end and this feature, combined with the rearwardly trailing arrangement with respect to the direction B, causes any temporarily adhering elongate material, such as weeds, root remnants, lost lengths of baler twine and the like, to be dragged slidably down each tine portion 9 during passage of the tine 6 concerned through the soil until it is lost from the lowermost free end or tip of the tine at a level which will usually be well beneath the ground surface. The replaceable elements 16 of the tine portions 9 are formed from a hard and durable material, which will usually be metallic, but, when any one of them eventually becomes so worn or damaged that it requires replacement, this can easily be effected by entering the end of any convenient rod or other levering tool in the bore 17 concerned and using that rod or other tool to unscrew the element 16 from the respective extension 15. A new element 16 can then be quickly, easily and inexpensively substituted. It may thus be possible very considerably to extend the useful life of one of the tines 6 merely by periodic replacements of the element 16. Naturally, after prolonged use, a time will eventually come when the upper portions of the tine 6 are so worn or damaged that the operating efficiency of the tine falls below an acceptable minimum at which time the whole of the tine will require replacement.

The cavity 13 in the upper half of the soil working portion 9 of each tine 6 enables a considerable quantity of tine material to be saved while still allowing said upper half to have such a thickness that entirely adequate rigidity is retained. In fact, the provision of the cavity 13 improves the attack of the tine upon the soil, the latter being well crumbled as it flows downwardly along the cavity 13 towards the lowermost end of the latter. The fastening portion 7 of each tine 6 is secured in its appointed working position relative to the corresponding shaft 2 and its supporting part 4 by the clamping nut 10 concerned, the center/longitudinal axis of that clamping nut 10 being coincident, or substantially coincident, with the axis a of the corresponding shaft 2. The lug 11 co-operates with the notch or recess 12 in preventing the tine 6 from turning about the axis a relative to its shaft 2 and the whole arrangement provides a very strong and reliable fastening of the tine 6 in its appointed working position without complication and consequent undue expense. When replacement of the whole of one of the tines 6 becomes necessary, a box or socket spanner or wrench can readily be employed temporarily to remove the clamping nut 10 concerned even when that nut 10 incorporates an insert designed to prevent accidental loosening. The described and illustrated tines 6 can easily be made by a forging process and it will be noted that the position of each fastening nut 10 immediately below the fastening portion 7 of the tine and between the cheeks 14 prevents that nut and the co-operating screwthread of the extension 15 from being damaged by stones and the like, or worn by abrasive wear, to an extent which will interfere with tine replacement. The tines 6 are so arranged in the single row thereof that, despite the fact that adjacent tines 6 revolve in opposite directions, there will always be a considerable degree of clearance between them and this makes it very unlikely indeed that any stones or other large hard objects will become jammed between neighbouring tines during operation, particularly if that operation is upon previously cultivated soil.

FIGS. 11, 12 and 13 of the drawings illustrate three alternative tine constructions and the way in which those tines are secured in their appointed working positions. However, many of the parts which are illustrated in FIGS. 11, 12 and 13 of the drawings are identical, or very similar, to parts which have already been described above and, accordingly, such parts are illustrated by the same references as have been employed in FIGS. 1 to 10 of the drawings and will not be described in detail again. FIG. 11 illustrates a tine 26 which comprises a soil working portion 27 that is of the same downwardly tapering shape as described above for the tines 6. The tine 26 is also secured in its appointed position in the same way as has been described above. However, in this case, each fastening nut 10 is disposed in a cavity 28 that is formed principally in the radially inner (with respect to the corresponding axis of rotation a) side of the curved portion 8 of the tine, the cavity 28 merging into the space beneath the fastening portion 7 of the tine 26 which is flanked by the two cheeks 14. The soil working portion 27 of each tine 26 is of circular or substantially circular cross-section throughout its length, exhibiting no cavity, but once again has substantially its lower half in the form of one of the downwardly tapering replaceable elements 16. When the tine 26 is installed in its working position, the fastening nut 10 again lies centrally with respect to the axis a in a protected position position between the two cheeks 14. Although not apparent in FIG. 11 of the drawings, it is noted that the soil working portion 27 of each tine 26 again trails from top to bottom with respect to the intended direction of operative rotation B of the soil working member 3 concerned in the same manner as has been described above for the tines 6 with particular reference to FIGS. 4 and 5 of the drawings. It has been found that the tines 26 are particularly suitable for the cultivation of very heavy soil.

FIG. 12 of the drawings illustrates a tine 29 which is very similar in many respects to the tine 26 of FIG. 11. However, the curved portion 8 between the fastening portion 7 thereof and the soil working portion 30 thereof is shorter than in the embodiment of FIG. 11 and encompasses an angle of a little less than 90° so that the longitudinal axis of the soil working portion 30 is downwardly divergent, rather than convergent, with respect to the axis of rotation a as seen in the elevational view of FIG. 12. A cavity 31 is formed in the radially inner (with respect to the axis a) side of the curved portion 8 and that cavity again merges with the nut-receiving space which is formed between the two cheeks 14 immediately beneath the fastening portion 7.

FIG. 13 illustrates a tine 32 which is similar to the tine 29 of FIG. 12 in substantially all respects except that its soil working portion is of integral formation throughout its length and does not incorporate one of the replaceable elements 16 so that the whole tine 32 must be replaced if it becomes badly worn or damaged. The tines 29 and 32 of FIGS. 12 and 13 of the drawings are fastened in their appointed positions, and operate, in substantially the same way as the tines 6 and 26 of FIGS. 1 to 11 of the drawings but the fact that the lowermost free ends or tips of their soil working portions are further spaced from the corresponding axes a than in the previous embodiments enables said tines 29 and 32 to work strips of soil of greater width at a level beneath that of the ground surface and can thus produce a superior cultivating effect with some soils and under certain working conditions.

The soil cultivating implement embodiments which have been described also form the subject of our copending Patent Application Ser. No. 088,150 filed Oct. 29, 1979) to which reference is directed.

Although various features of the soil cultivating implements that have been described and/or that are illustrated in the accompanying drawings will be set forth in the following claims as inventive features, it is emphasised that the invention is not necessarily limited to those features and that it includes within its scope each of the parts of each soil cultivating implement that has been described, and/or that is illustrated in the accompanying drawings, both individually and in various combinations.

What is claimed is:

1. A soil cultivating implement comprising a frame and a plurality of soil working members arranged in a transverse row for rotation about an upwardly extending axis, at least one of said soil working members having a substantially vertical shaft that defines its axis of rotation and a single tine supported adjacent the lower end of said shaft, an upper fastening portion of said tine being connected to said shaft by clamping means, said lower shaft end comprising a substantially flat supporting part that mounts a downwardly extending stub shaft, the upper side of said fastening portion being substantially horizontal and flat with downwardly extending cheek sides and having an aperture that receives said downwardly extending stubshaft, said stubshaft extending through said fastening portion and into a protected open space defined by the cheek sides, below said supporting part, said clamping means securing the upper surface of said fastening portion against the lower side of said flat supporting part, and soil working portion having an upwardly extending inner cavity that merges into the lower surface of said fastening portion and defines said protected space between said cheek sides, said cheek sides defining a U-shaped open space with one cheek being located in advance of the other relative to the direction of rotation of the soil working member, said cavity extending for a substantial distance along the length of the lower soil working portion of said tine.

2. An implement as claimed in claim 1, wherein said upper surface is recessed around a central hole which receives said stub shaft.

3. An implement as claimed in claim 1, wherein said tine has a downwardly tapering soil working portion of substantially circular cross-section, the diameter of said cross-section at the top of the soil working portion being not less than five times the diameter of the cross-section of the soil working portion adjacent the lowermost end thereof, said soil working portion having a length not less than five times the diameter of the soil working portion at the upper end thereof.

4. An implement as claimed in claim 1, wherein said soil working portion is spaced from said axis of rotation, the lower end of the soil working portion being located closer to said axis than the upper end thereof.

5. An implement as claimed in claim 1, wherein said soil working portion is spaced from the axis of rotation of the soil working member and the lower end of that portion is located further from said axis of rotation than the upper end thereof.

6. An implement as claimed in claim 1, wherein the distance between the axes of rotation of immediately neighboring soil working members is about 15 cms. and each tine has a soil working portion spaced from the axis of rotation of the corresponding soil working member by a maximum distance of about 12 cms.

7. An implement as claimed in claim 1, wherein said clamping means comprises a nut that is threaded on said stubshaft, an upwardly directed lug on said fastening portion being received in a matching recess in said shaft part.

8. An implement as claimed in claim 7, wherein said lug has upwardly convergent opposite side surfaces.

* * * * *